(12) United States Patent
Miyahara et al.

(10) Patent No.: US 10,604,630 B2
(45) Date of Patent: Mar. 31, 2020

(54) POLYARYLENE SULFIDE PRODUCTION METHOD AND POLYARYLENE SULFIDE PRODUCTION APPARATUS

(71) Applicant: Kureha Corporation, Chuo-ku, Tokyo (JP)

(72) Inventors: Michihisa Miyahara, Tokyo (JP); Kenji Suzuki, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/096,837

(22) PCT Filed: Jan. 11, 2018

(86) PCT No.: PCT/JP2018/000477
§ 371 (c)(1),
(2) Date: Oct. 26, 2018

(87) PCT Pub. No.: WO2018/135372
PCT Pub. Date: Jul. 26, 2018

(65) Prior Publication Data
US 2019/0338075 A1 Nov. 7, 2019

(30) Foreign Application Priority Data

Jan. 18, 2017 (JP) .................. 2017-006747

(51) Int. Cl.
*C08G 75/0227* (2016.01)
*C08G 75/0259* (2016.01)
*C08G 75/0281* (2016.01)

(52) U.S. Cl.
CPC ..... *C08G 75/0227* (2013.01); *C08G 75/0259* (2013.01); *C08G 75/0281* (2013.01)

(58) Field of Classification Search
CPC ............... C08G 75/14; C08G 75/0263; C08G 75/0268; C08G 75/0259; C08G 75/025; B30B 9/28
See application file for complete search history.

(56) References Cited

U.S. PATENT DOCUMENTS 5,840,830 A   11/1998  Miyahara et al.
9,896,548 B2   2/2018  Suzuki et al.
(Continued)

FOREIGN PATENT DOCUMENTS

CN   103134133 A   6/2013
CN   106062039 A   10/2016
(Continued)

OTHER PUBLICATIONS

First Office Action issued by China National Intellectual Property Administration for CN201880001618.6/PCT/JP2018/000477 dated Apr. 17, 2018.
(Continued)

*Primary Examiner* — Shane Fang
(74) *Attorney, Agent, or Firm* — Abel Schillinger, LLP

(57) ABSTRACT

Provided is a PAS production method and a PAS production apparatus wherein, in a gas-liquid system including a gas phase containing water, a dihalo aromatic compound, and hydrogen sulfide and a liquid phase containing a polar organic solvent and PAS, the dihalo aromatic compound and the hydrogen sulfide that can be volatilized at the time of dehydration from the gas phase can be recovered. The PAS production method according to the present invention includes:
a condensation step of obtaining a first intermediate gas phase containing a dihalo aromatic compound and hydrogen sulfide and a first intermediate liquid phase containing water, a dihalo aromatic compound, and a sulfur source by condensation from the gas phase in the gas-liquid;
(Continued)

a first recovery step of bringing the first intermediate gas phase into contact with a polar organic solvent to obtain a first recovered gas phase containing hydrogen sulfide and a first recovered liquid phase containing a polar organic solvent, a dihalo aromatic compound, and a sulfur source; and a second recovery step of bringing the first recovered gas phase into contact with an alkali metal hydroxide aqueous solution to obtain a second recovered liquid phase containing water, a sulfur source, and an alkali metal hydroxide.

9 Claims, 3 Drawing Sheets

(56) References Cited

U.S. PATENT DOCUMENTS

| | | | |
|---|---|---|---|
| 9,908,974 | B2 | 3/2018 | Kobayashi et al. |
| 2006/0089486 | A1 | 4/2006 | Sato et al. |
| 2011/0319587 | A1 | 12/2011 | Hinokimori |
| 2015/0087777 | A1 | 3/2015 | Chiong |
| 2015/0087778 | A1 | 3/2015 | Chiong |
| 2017/0029570 | A1 | 2/2017 | Kobayashi et al. |

FOREIGN PATENT DOCUMENTS

| | | |
|---|---|---|
| CN | 106164133 A | 11/2016 |
| JP | 02160833 A | 6/1990 |
| JP | H09286861 A | 11/1997 |
| JP | H10007798 A | 1/1998 |
| JP | H10158399 A | 6/1998 |
| JP | 2010144085 A | 7/2010 |
| JP | 2015218214 A | 12/2015 |
| JP | 2016536376 A | 11/2016 |
| JP | 2016536377 A | 11/2016 |
| JP | 2017043748 A | 3/2017 |
| WO | 2010058713 A1 | 5/2010 |
| WO | 2015/047721 A1 | 4/2015 |

OTHER PUBLICATIONS

Search Report issued by China National Intellectual Property Administration for CN201880001618.6/PCT/JP2018/000477 dated Apr. 9, 2018.

Translation of International Search Report for WO PCT/JP2018/000477 dated Apr. 3, 2018.

Translation of the First Office Action issued by China National Intellectual Property Administration for CN201880001618.6/PCT/JP2018/000477 dated Apr. 17, 2019.

Translation of the Extended Search Report issued by China National Intellectual Property Administration for CN201880001618.6/PCT/JP2018/000477 dated Apr. 9, 2019.

Translation of the International Preliminary Report on Patentability of the International Searching Authority for PCT/JP2018/000477 dated Apr. 3, 2018.

Office Action from IN Patent Application No. 201817038498 dated Dec. 30, 2019, 6 pgs.

POLYARYLENE SULFIDE PRODUCTION METHOD AND POLYARYLENE SULFIDE PRODUCTION APPARATUS

TECHNICAL FIELD

The present invention relates to a polyarylene production method and a polyarylene sulfide production apparatus.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS can be formed into various molded products, films, sheets, fibers, and the like by ordinary melt processing methods such as extrusion molding, injection molding, and compression molding. Therefore, PAS has been widely used in a wide variety of fields, such as electric devices, electronic devices, devices for automobiles, and packaging material.

In the production of PAS, water mixed into the reaction system together with the starting materials, and water produced by the reaction are likely to induce side reactions at the time of polymerization, and inhibit the macromolecularization of PAS. Therefore, a method of polymerizing PAS while minimizing the water content present in the reaction system has been proposed. For example, there is a known method of performing polymerization while reducing the water content present in the reaction system to or below a certain level by performing dehydration from a water-containing sulfur source and performing dehydration by further removing water (for example, Patent Document 1).

CITATION LIST

Patent Literature

Patent Document 1: WO 2010/058713

SUMMARY OF INVENTION

Technical Problem

In the known method disclosed in Patent Document 1 or the like, a dihalo aromatic compound, which is a reaction starting material, and hydrogen sulfide originating from the sulfur source, which is also a reaction starting material, are volatilized together with the water discharged from within the reaction system to outside the reaction system by dehydration. Therefore, there is a concern of decreases in yield, and in the case of hydrogen sulfide, in particular, there is a concern of increases in the environmental burden.

The present invention was conceived in light of the problem described above, and an object of the present invention is to provide a PAS production method and a PAS production apparatus wherein, in a gas-liquid system including a gas phase containing water, a dihalo aromatic compound, and hydrogen sulfide and a liquid phase containing a polar organic solvent and PAS, the dihalo aromatic compound and the hydrogen sulfide that can be volatilized from the gas phase at the time of dehydration can be recovered.

Solution to Problem

The present inventors discovered that the problem described above can be solved by successively bringing the aforementioned gas phase after dehydration into contact with a polar organic solvent and an alkali metal hydroxide aqueous solution, and the present inventors thereby completed the present invention.

The PAS production method according to an embodiment of the present invention includes:

a condensation step of obtaining, by condensation from a gas phase in a gas-liquid system including a gas phase containing water, a dihalo aromatic compound, and hydrogen sulfide and a liquid phase containing a polar organic solvent and PAS, a first intermediate gas phase containing a dihalo aromatic compound and hydrogen sulfide and a first intermediate liquid phase containing water, a dihalo aromatic compound, and a sulfur source;

a first recovery step of bringing the first intermediate gas phase into contact with a polar organic solvent to obtain a first recovered gas phase containing hydrogen sulfide and a first recovered liquid phase containing a polar organic solvent, a dihalo aromatic compound, and a sulfur source; and a second recovery step of bringing the first recovered gas phase into contact with an alkali metal hydroxide aqueous solution to obtain a second recovered liquid phase containing water, a sulfur source, and an alkali metal hydroxide.

The PAS production apparatus according to an embodiment of the present invention includes:

a dehydration part configured to produce, by condensation from a gas phase in a gas-liquid system including a gas phase containing water, a dihalo aromatic compound, and hydrogen sulfide and a liquid phase containing a polar organic solvent and PAS, a first intermediate gas phase containing a dihalo aromatic compound and hydrogen sulfide and a first intermediate liquid phase containing water, a dihalo aromatic compound, and a sulfur source;

a first recovery part configured to bring the first intermediate gas phase into contact with a polar organic solvent to produce a first recovered gas phase containing hydrogen sulfide and a first recovered liquid phase containing a polar organic solvent, a dihalo aromatic compound, and a sulfur source; and a second recovery part configured to bring the first recovered gas phase into contact with an alkali metal hydroxide aqueous solution to produce a second recovered liquid phase containing water, a sulfur source, and an alkali metal hydroxide.

Advantageous Effects of Invention

With the present invention, it is possible to provide a PAS production method and a PAS production apparatus wherein, in a gas-liquid system including a gas phase containing water, a dihalo aromatic compound, and hydrogen sulfide and a liquid phase containing a polar organic solvent and PAS, the dihalo aromatic compound and the hydrogen sulfide that can be volatilized from the gas phase at the time of dehydration can be recovered.

DESCRIPTION OF EMBODIMENTS

PAS Production Method

Figure 1:
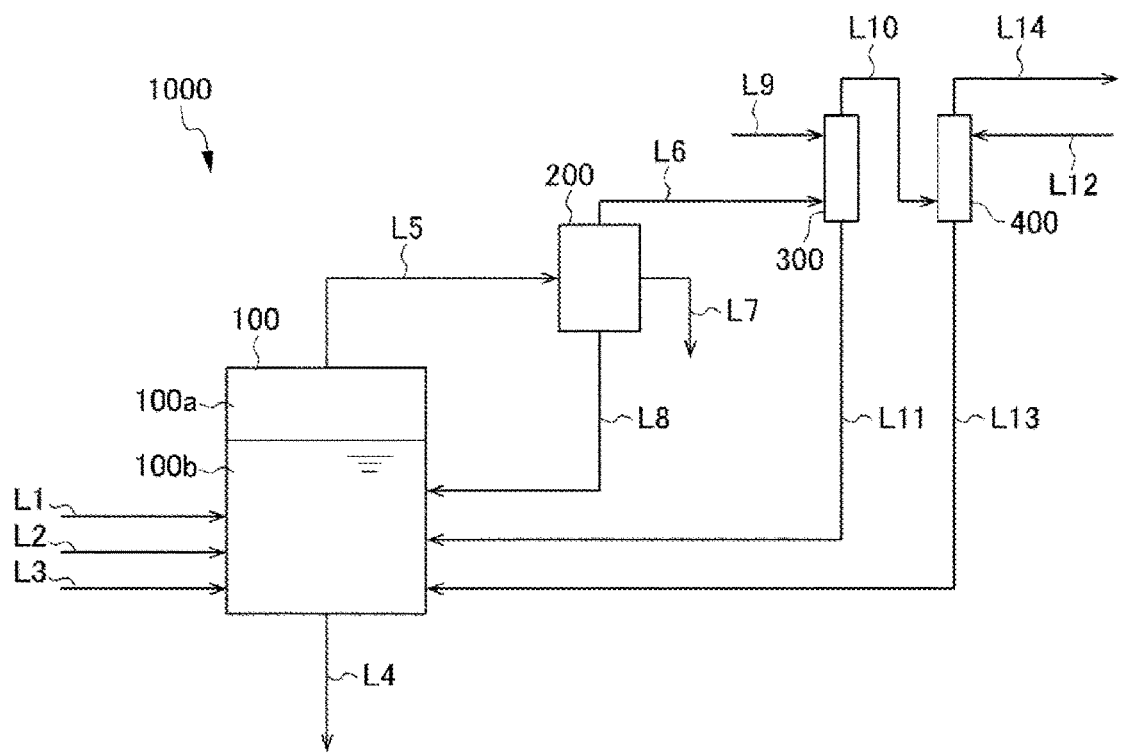
FIG. 1 is a schematic diagram illustrating an embodiment of the PAS production apparatus according to the present invention.

The PAS production method according to an embodiment of the present invention includes:
a condensation step of obtaining, by condensation from a gas phase in a gas-liquid system including a gas phase containing water, a dihalo aromatic compound, and hydrogen sulfide and a liquid phase containing a polar organic solvent and PAS, a first intermediate gas phase containing a dihalo aromatic compound and hydrogen sulfide and a first intermediate liquid phase containing water, a dihalo aromatic compound, and a sulfur source;
a first recovery step of bringing the first intermediate gas phase into contact with a polar organic solvent to obtain a first recovered gas phase containing hydrogen sulfide and a first recovered liquid phase containing a polar organic solvent, a dihalo aromatic compound, and a sulfur source; and
a second recovery step of bringing the first recovered gas phase into contact with an alkali metal hydroxide aqueous solution to obtain a second recovered liquid phase containing water, a sulfur source, and an alkali metal hydroxide. With the PAS production method according to an embodiment of the present invention, the dihalo aromatic compound and hydrogen sulfide that can be volatilized from the gas phase at the time of dehydration in the gas-liquid system can be recovered effectively.

Condensation Step

In the condensation step, a first intermediate gas phase containing a dihalo aromatic compound and hydrogen sulfide and a first intermediate liquid phase containing water, a dihalo aromatic compound, and a sulfur source are obtained by condensation from a gas phase in a gas-liquid system including a gas phase containing water, a dihalo aromatic compound, and hydrogen sulfide and a liquid phase containing a polar organic solvent and PAS. With the condensation step described above, dehydration can be performed sufficiently from the gas phase in the gas-liquid system. Thus, the dihalo aromatic compound is unevenly distributed primarily in the first intermediate liquid phase, and hydrogen sulfide is uneven distributed primarily in the first intermediate gas phase.

The gas-liquid system is not particularly limited as long as it assumes the configuration described above, and an example thereof is a gas-liquid system obtained by a polymerization step described below. Substances typically used in the production of PAS can be used as the dihalo aromatic compound and the polar organic solvent. Specific examples are as described in detail in the description regarding the polymerization step. Condensation from the gas phase can be performed by a known method. For example, condensation may be performed using a distillation column.

The molar ratio DH11/DH12 of the dihalo aromatic compound (DH11) in the first intermediate gas phase and the dihalo aromatic compound (DH12) in the first intermediate liquid phase is ordinarily less than 1, preferably not greater than 0.5, and more preferably not greater than 0.2 from the perspective of the efficiency of recovering the dihalo aromatic compound. The lower limit of the molar ratio is not particularly limited and may be, for example, not less than 0.03 or not greater than 0.05.

The ratio S1/S2 of the number of moles (S1) of the hydrogen sulfide in the first intermediate gas phase to the number of moles (S2) of the sulfur source in the first intermediate liquid phase in terms of hydrogen sulfide is ordinarily not less than 1, preferably not less than 2, and more preferably not less than 5 from the perspective of the efficiency of recovering the sulfur source. The upper limit of the molar ratio is not particularly limited and may be, for example, not greater than 1000 or not greater than 500.

The sulfur source content of the first intermediate liquid phase is small. Therefore, the first intermediate liquid phase may be disposed of directly, or may be disposed of as a mixture containing water and the sulfur source after the dihalo aromatic compound is separated and recovered as a liquid phase by a liquid-liquid separation method or after the dihalo aromatic compound is separated and recovered as a solid phase by a solid-liquid separation method, for example. However, from the perspective of the enhancement of yield, the reduction of the environmental burden, and the like, the dihalo aromatic compound and the sulfur source are preferably recovered from the first intermediate liquid phase. At least a portion of the recovered dihalo aromatic compound and at least a portion of the recovered sulfur source may be respectively used as at least a portion of the dihalo aromatic compound and at least a portion of the sulfur source in the polymerization step described below, for example. Note that in the recovery of the sulfur source from the first intermediate liquid phase, at least a portion of the hydrogen sulfide in the first intermediate liquid phase (1) may be absorbed in advance in the alkali metal hydroxide aqueous solution used in the second recovery step described below; (2) may be brought into contact with the alkali metal hydroxide aqueous solution together with the first recovered gas phase in the second recovery step; and/or (3) may be absorbed in the second recovered liquid phase described below.

First Recovery Step

In the first recovery step, the first intermediate gas phase is brought into contact with a polar organic solvent to obtain a first recovered gas phase containing hydrogen sulfide and a first recovered liquid phase containing a polar organic solvent, a dihalo aromatic compound, and a sulfur source. With the first recovery step described above, the dihalo aromatic compound can be sufficiently recovered primarily in the first recovered liquid phase from the first intermediate gas phase. In addition, with the first recovery step described above, a portion of hydrogen sulfide can be recovered in the first recovered liquid phase from the first intermediate gas phase.

The number of moles (S4) of the sulfur source in the first recovered liquid phase in terms of hydrogen sulfide is not particularly limited. However, from the perspective of reducing the load of the sulfur source in the second recovery step or the like, the number of moles (S4) is not less than 5%, preferably not less than 10%, and more preferably not less than 20% of a value calculated from the hydrogen sulfide saturated solubility concentration in the organic solvent, that is, a value calculated by the product of the hydrogen sulfide saturated solubility on a molar basis and the amount of organic solvent used in the first recovery step (hydrogen sulfide saturated solubility on a molar basis x amount of organic solvent used in the first recovery step). The upper limit of the number of moles (S4) is also not particularly limited, but may be, for example, not greater than a value calculated from the hydrogen sulfide saturated solubility concentration in the organic solvent or not greater than 90% of that value.

Note that the polar organic solvent may contain an alkaline substance and preferably contain an alkali metal hydroxide.

Nearly the total amount of the dihalo aromatic compound is preferably recovered in the first recovered liquid phase from the perspective of cost reduction and the like by means of enhanced efficiency of the recovery of the dihalo aromatic compound. More specifically, the molar ratio DH22/DH11 of the dihalo aromatic compound (DH22) in the first recovered gas phase and the dihalo aromatic compound (DH11) in the first intermediate gas phase is preferably not less than 0 and not greater than 0.2, more preferably not less than 0 and not greater than 0.05, and most preferably 0.

From the perspective of the enhancement of yield or the like, at least a portion of the dihalo aromatic compound in the first recovered liquid phase is preferably used as at least a portion of the dihalo aromatic compound in the polymerization step described below. Similarly, from the perspective of the enhancement of yield or the like, at least a portion of the sulfur source in the first recovered liquid phase is preferably used as at least a portion of the sulfur source in the polymerization step described below.

The proportion of the dihalo aromatic compound in the first recovered liquid phase used in the polymerization reaction (amount of the dihalo aromatic compound in the first recovered liquid phase used in polymerization/amount of the dihalo aromatic compound in the first recovered liquid phase) is not less than 0.05, preferably not less than 0.2, and more preferably not less than 0.5 from the perspective of cost reduction by means of enhanced efficiency of the recovery of the dihalo aromatic compound. In addition, the proportion of the sulfur source in the first recovered liquid phase used in the polymerization reaction (amount of the sulfur source in the first recovered liquid phase used in polymerization/amount of the sulfur source in the first recovered liquid phase) is not less than 0.05, preferably not less than 0.2, and more preferably not less than 0.5 from the perspective of cost reduction by means of enhanced efficiency of the recovery of the sulfur source.

From the perspective of the enhancement of workability or the like, the polar organic solvent in the first recovered liquid phase is preferably of the same type as the polar organic solvent in the polymerization step described below. When both polar organic solvents are of the same type, at least a portion of the dihalo aromatic compound in the first recovered liquid phase and at least a portion of the sulfur source in the first recovered liquid phase can be used directly in the polymerization reaction in the polymerization step described below.

Second Recovery Step

In the second recovery step, the first recovered gas phase is brought into contact with an alkali metal hydroxide aqueous solution to obtain a second recovered liquid phase containing water, a sulfur source, and an alkali metal hydroxide. With the second recovery step, hydrogen sulfide can be sufficiently recovered in the second recovered liquid phase from the first recovered gas phase. The concentration of the alkali metal hydroxide aqueous solution is not particularly limited but is preferably a concentration at which hydrogen sulfide can be sufficiently recovered, more preferably from 5 to 80 mass %, and even more preferably from 10 to 77 mass %. Note that the hydrogen sulfide in the first recovered gas phase may react with the alkali metal hydroxide in the alkali metal hydroxide aqueous solution to produce an alkali metal sulfide and an alkali metal hydrosulfide. Therefore, the second recovered liquid phase contains a sulfur source such as an alkali metal sulfide, an alkali metal hydrosulfide, and hydrogen sulfide. Note that the alkali metal hydroxide aqueous solution may contain a polar organic solvent.

The amount of the sulfur source in the second recovered liquid phase (in terms of hydrogen sulfide) is preferably from 80 to 100 mol % and more preferably from 90 to 100 mol % when the amount of hydrogen sulfide in the first recovered gas phase is defined as 100 mol %.

From the perspective of the enhancement of yield or the like, at least a portion of the sulfur source in the second recovered liquid phase is preferably used as at least a portion of the sulfur source in the polymerization step described below.

Most of the sulfur source is preferably recovered in the second recovered liquid phase from the perspectives of cost reduction by means of enhanced efficiency of the recovery of the sulfur source, the environment, safety, and the like. More specifically, the molar ratio S5/S3 of the sulfur source (S5) in the second recovered liquid phase and the hydrogen sulfide (S3) in the first recovered gas phase is preferably not less than 0.5, more preferably not less than 0.7, even more preferably not less than 0.8, and most preferably not less than 0.9.

Polymerization Step

The PAS production method according to an embodiment of the present invention may further include, prior to the condensation step, a polymerization step of polymerizing the sulfur source and the dihalo aromatic compound in a polar organic solvent while evaporating water from the liquid phase of the reaction system containing a polar organic solvent, water, a sulfur source, and a dihalo aromatic compound to the gas phase of the reaction system to produce PAS and to obtain the gas-liquid system described above. Substances typically used in the production of PAS can be used as the polar organic solvent, the sulfur source, and the dihalo aromatic compound. Examples of the polar organic solvents include organic amide solvents; aprotic organic solvents containing organic sulfur compounds; and aprotic polar organic solvents containing cyclic organic phosphorus compounds. Examples of the organic amide solvents include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (also called "NMP" hereafter) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide. Examples of aprotic polar organic solvents containing organic sulfur compounds include dimethylsulfoxide and diphenylsulfone. An example of an aprotic polar organic solvent containing a cyclic organic phosphorus compound is 1-methyl-1-oxophosphorane. Of these, organic amide solvents are preferable from the perspective of availability, handleability or the like; N-alkyl pyrrolidone compounds, N-cycloalkyl pyrrolidone compounds, N-alkyl caprolactam compounds, and N,N-dialkyl imidazolidinone compounds are more preferable; and NMP, N-methyl-ε-caprolactam, and 1,3-dialkyl-2-imidazolidinone are even more preferable, and NMP is particularly preferable. The amount of the polar organic solvent that is used is preferably from 1 to 30 mol and more preferably from 3 to 15 mol per mol of the sulfur source from the perspective of the efficiency of the polymerization reaction or the like.

Examples of the sulfur source include alkali metal sulfides, alkali metal hydrosulfides, and hydrogen sulfide, and the sulfur source is preferably an alkali metal sulfide and an alkali metal hydrosulfide. The sulfur source can be handled in the state of an aqueous slurry or an aqueous solution, for example, and is preferably in the state of an aqueous solution from the perspective of handleability in terms of measurability or transportability. Examples of the alkali metal sulfides include lithium sulfide, sodium sulfide, potassium sulfide, rubidium sulfide, and cesium sulfide. Examples of the alkali metal hydrosulfides include lithium hydrosulfide, sodium hydrosulfide, potassium hydrosulfide, rubidium hydrosulfide, and cesium hydrosulfide.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom refers to each atom of fluorine, chlorine, bromine, and iodine. Two halogen atoms in the dihalo aromatic compound may be the same or different. Of these, p-dihalobenzene, m-dihalobenzene or a mixture thereof is preferable from the perspective of availability, reactivity and the like, p-dihalobenzene is more preferable, and p-dichlorobenzene (also called "pDCB" hereafter) is particularly preferable. The amount of the dihalo aromatic compound that is used is preferably from 0.90 to 1.50 mol, more preferably from 0.92 to 1.10 mol, and even more preferably from 0.95 to 1.05 mol per 1 mol of the charged sulfur source. When the amount used is within the range described above, degradation reactions are unlikely to occur, and stable polymerization reactions are easy to perform, which makes it easy to produce a high-molecular weight polymer.

The polar organic solvent, the sulfur source, and the dihalo aromatic compound may each be used alone, or two or more types thereof may be mixed and used as long as the combination can produce PAS.

The polymerization reaction is a polymerization reaction entailing starting a polymerization reaction by heating a mixture containing the sulfur source and the dihalo aromatic compound to produce a polymer having a melt viscosity of not less than 0.1 Pa·s when measured at a temperature of 310° C. and a shear rate of 1216 sec$^{-1}$. The reaction may be divided into two or more stages to obtain a PAS with a higher viscosity. The polymerization reaction is preferably a first-stage polymerization reaction between the sulfur source and the dihalo aromatic compound, for example. The first-stage polymerization reaction is a polymerization reaction entailing starting a polymerization reaction by heating a mixture containing the sulfur source and the dihalo aromatic compound to produce a prepolymer having a dihalo aromatic compound conversion ratio of 50% or greater.

In the polymerization reaction described above, the polymerization reaction is preferably performed while heating at a temperature of from 170 to 300° C. from the perspective of the efficiency of the polymerization reaction or the like. The polymerization temperature in the polymerization step is more preferably in the range of from 180 to 280° C. from the perspective of suppressing side reactions and decomposition reactions. In particular, in the first-stage polymerization reaction, it is preferable from the perspective of the efficiency of the polymerization reaction or the like to start a polymerization reaction while heating at a temperature of from 170 to 270° C. to produce a prepolymer having a dihalo aromatic compound conversion ratio of 50% or greater. The polymerization temperature in the first-stage polymerization reaction is preferably selected from the range of 180 to 265° C. from the perspective of suppressing side reactions and decomposition reactions.

The dihalo aromatic compound conversion ratio is preferably from 50 to 98%, more preferably from 60 to 97%, even more preferably from 65 to 96%, and particularly preferably from 70 to 95%. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

The polymerization reactions in the polymerization step may be performed in batch processing or may be performed continuously. For example, in the polymerization step described above, the polymerization reactions may be performed continuously by performing at least the following concurrently:

the supply of a polar organic solvent, a sulfur source, and a dihalo aromatic compound; the production of PAS by means of polymerization of the sulfur source and the dihalo aromatic compound in the polar organic solvent; and the recovery of a reaction mixture containing the PAS.

From the perspective of enabling resource saving, energy saving, equipment cost reduction, and the like, PAS is preferably produced continuously by performing the following operations concurrently:

Operation 1: a continuous starting material supply operation of continuously supplying a polar organic solvent, a sulfur source, and a dihalo aromatic compound;

Operation 2: a continuous dehydration operation of continuously discharging the water inside the reaction system to the outside of the reaction system;

Operation 3: a continuous polymerization operation of continuously polymerizing the sulfur source and the dihalo aromatic compound in a polar organic solvent;

Operation 4: a pressure adjustment operation of adjusting the pressure inside the reaction system by continuously discharging non-condensable gas inside the reaction system to the outside of the reaction system; and Operation 5: a continuous recovery operation of continuously recovering the produced reaction mixture.

More specifically, in the polymerization step described above, PAS is preferably produced continuously by performing the following steps concurrently: supplying at least a polar organic solvent, at least one type of sulfur source selected from the group consisting of alkali metal sulfides, alkali metal hydrosulfides, and hydrogen sulfide, and a dihalo aromatic compound to a housing chamber in a PAS production apparatus which is equipped with a housing chamber for housing a plurality of reaction vessels and in which the reaction vessels are connected in series; forming a reaction mixture by performing a polymerization reaction between the sulfur source and the dihalo aromatic compound in the polar organic solvent in each of the reaction vessels; removing at least a portion of the water inside the housing chamber from the housing chamber via a gas phase in the housing chamber; and successively moving the reaction mixture to each of the reaction vessel. The reaction vessels are connected in series in decreasing order of the maximum liquid surface level of a liquid that can be housed by each of the reaction vessels, and the reaction mixture is preferably successively moved from reaction vessels of higher maximum liquid surface levels to reaction vessels of lower maximum liquid surface levels in accordance with the order described above due to differences in the maximum liquid surface level. A step of feeding an inert gas into the gas phase toward the upstream side from the downstream side in the movement direction of the reaction mixture is more preferably further performed concurrently. The polymerization step for continuously producing PAS in this way can be performed with a PAS continuous production apparatus disclosed as Embodiments 1 and 2 described below.

PAS Production Apparatus

The PAS production apparatus according to an embodiment of the present invention includes:

a dehydration part configured to produce, by condensation from a gas phase in a gas-liquid system including a gas phase containing water, a dihalo aromatic compound, and hydrogen sulfide and a liquid phase containing a polar organic solvent and polyarylene sulfide, a first intermediate gas phase containing a dihalo aromatic compound and hydrogen sulfide and a first intermediate liquid phase containing water, a dihalo aromatic compound, and a sulfur source;

a first recovery part configured to bring the first intermediate gas phase into contact with a polar organic solvent to produce a first recovered gas phase containing hydrogen sulfide and a first recovered liquid phase containing a polar organic solvent, a dihalo aromatic compound, and a sulfur source; and a second recovery part configured to bring the first recovered gas phase into contact with an alkali metal hydroxide aqueous solution to produce a second recovered liquid phase containing water, a sulfur source, and an alkali metal hydroxide. With the PAS production apparatus according to an embodiment of the present invention, the dihalo aromatic compound and hydrogen sulfide that can be volatilized at the time of dehydration from the gas phase in the gas-liquid system can be recovered effectively.

FIG. 1 is a schematic diagram illustrating an embodiment of the PAS production apparatus according to an embodiment of the present invention. The configuration and operation of this embodiment will be described hereinafter with reference to FIG. 1.

A PAS production apparatus 1000 according to the embodiment described above includes a polymerization part 100, a dehydration part 200, a first recovery part 300, and a second recovery part 400. A polar organic solvent, a sulfur source, and a dihalo aromatic compound are respectively supplied to the polymerization part 100 through lines L1 to L3. A gas phase 100a and a liquid phase 100b are housed inside the polymerization part 100. The polymerization part 100 polymerizes the sulfur source and the dihalo aromatic compound in the polar organic solvent to produce PAS. A reaction mixture containing the PAS produced by the polymerization part 100, the polar organic solvent, and an alkali metal halide is recovered through a line L4. The gas phase 100a communicates with the dehydration part 200 through a line L5. The dehydration part 200 produces a first intermediate gas phase containing a dihalo aromatic compound (DH11) and hydrogen sulfide (S1) and a first intermediate liquid phase containing water, a dihalo aromatic compound (DH12), and a sulfur source (S2) by means of condensation from the gas phase 100a containing water, a dihalo aromatic compound, and hydrogen sulfide. Therefore, at least water, the dihalo aromatic compound, hydrogen sulfide (present in the gas phase), and the sulfur source (present in the liquid phase) are contained in the dehydration part 200. The first intermediate gas phase is supplied to the first recovery part 300 through a line L6. On the other hand, the first intermediate liquid phase is separated into water and the sulfur source, and the dihalo aromatic compound by a separation part (not illustrated) which constitutes a portion of the dehydration part 200. The separation part may be a liquid-liquid separation part or a solid-liquid separation part, and a specific example is a settler or the like. The water and sulfur source (S2) of the first liquid phase are disposed of through a line L7, and the dihalo aromatic compound (DH12) is supplied to the polymerization part 100 through a line L8 and reused as a starting material for a polymerization reaction. The first recovery part 300 brings the first intermediate gas phase supplied through the line L6 into contact with a polar organic solvent supplied to the first recovery part 300 through a line L9 to produce a first recovered gas phase containing hydrogen sulfide (S3) and a first recovered liquid phase containing a polar organic solvent, a dihalo aromatic compound, and a sulfur source (S4). Therefore, at least the dihalo aromatic compound, hydrogen sulfide (present in the gas phase), the sulfur source (present in the liquid phase), and the polar organic solvent are contained in the first recovery part 300. The first recovered gas phase is supplied to the second recovery part 400 through a line L10. On the other hand, the first recovered liquid phase is supplied to the polymerization part 100 through a line L11, and the components in the first recovered liquid phase are reused as starting materials for a polymerization reaction. The second recovery part 400 brings the first recovered gas phase supplied through the line L10 into contact with an alkali metal hydroxide aqueous solution supplied to the second recovery part 400 through a line L12 to produce a second recovered liquid phase containing water, a sulfur source (S5), and an alkali metal hydroxide and a disposal gas phase containing the residual hydrogen sulfide. Therefore, at least the hydrogen sulfide (present in the gas phase), the sulfur source (present in the liquid phase), water, and the alkali metal hydroxide are contained in the second recovery part 400. The second recovered liquid phase is supplied to the polymerization part 100 through a line L13, and the components in the second recovered liquid phase are reused as starting materials for a polymerization reaction. On the other hand, the disposal gas phase is disposed of through a line L14. The concentration of hydrogen sulfide in the disposal gas phase is kept low, and therefore a reduction in yield or an increase in the environmental burden is unlikely to occur.

The polymerization part 100 is not particularly limited, and a known polymerization vessel, for example, may be used in either batch processing or continuous processing. The dehydration part 200 is not particularly limited, and a known distillation column, for example, may be used. The first recovery part 300 is not particularly limited as long as it employs a method of bringing the first intermediate gas phase into contact with a polar organic solvent, and an example thereof is a wet gas scrubber. The second recovery part 400 is not particularly limited as long as it employs a method of bringing the first recovered gas phase into contact with an alkali metal hydroxide aqueous solution, and an example thereof is a wet gas scrubber. In the cases of both the first recovery part 300 and the second recovery part 400, the wet gas scrubber is not particularly limited, and examples thereof include a packed column, a plate column, a spray column (scrubber), and a bubbling absorption column. Packed columns are preferably used as the first recovery part 300 and the second recovery part 400. With a packed column, the amount of liquid that is held is small, and thus the time required to reach a steady state is short, a high recovery rate can be easily achieved with a small amount of liquid, with minimal drop in pressure. Note that in the first recovery part 300, the first intermediate gas phase may be brought into contact with the polar organic solvent with a countercurrent or a parallel current. In addition, in the second recovery part 400, the first recovered gas phase may be brought into contact with the alkali metal hydroxide aqueous solution with a countercurrent or a parallel current. A specific example of a case in which a PAS continuous production apparatus is used as the polymerization part 100 will be described in detail hereinafter.

Embodiment 1 of the Polymerization Part 100

Figure 2:
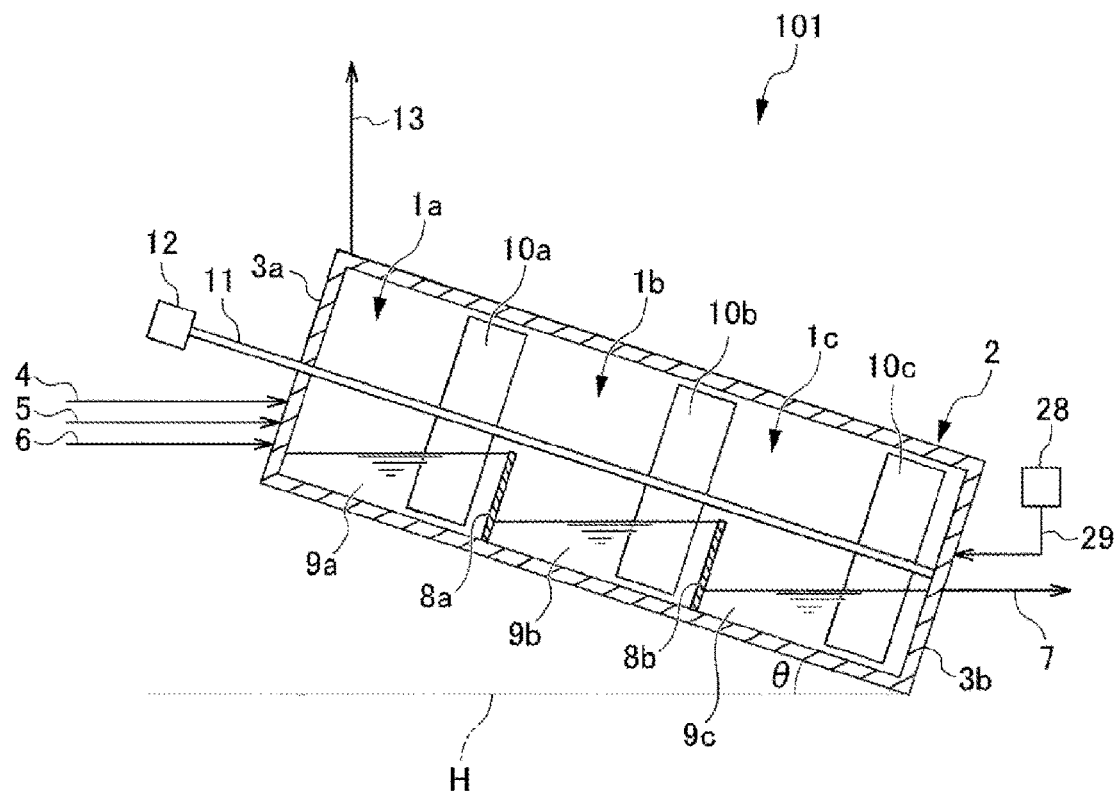
FIG. 2 is a partial cross-sectional view illustrating an embodiment of a polymerization part 100 in the case of a PAS continuous production apparatus.

FIG. 2 is a partial cross-sectional view illustrating an embodiment (called "Embodiment 1" hereafter) of a polymerization part 100 in the case of a PAS continuous production apparatus. The configuration of Embodiment 1 will be described hereinafter with reference to FIG. 2.

A PAS continuous production apparatus 101 according to Embodiment 1 includes a housing chamber 2 which houses reaction vessels 1*a*, 1*b*, and 1*c*. In the PAS continuous production apparatus 101, the housing chamber 2 is installed at an incline so as to form an angle θ with respect to the horizontal plane H. The shape of the housing chamber 2 is not particularly limited, and examples thereof include a hollow cylindrical shape or a hollow prismatic shape in which a side wall 3*a* in contact with the reaction vessel 1*a* and a side wall 3*b* in contact with the reaction vessel 1*c* are used as a bottom face.

A polar organic solvent supply line 4 for supplying a polar organic solvent to the housing chamber 2, a sulfur source supply line 5 for supplying at least one type of a sulfur source selected from the group consisting of alkali metal sulfides, alkali metal hydrosulfides, and hydrogen sulfide to the housing chamber 2, and a dihalo aromatic compound supply line 6 for supplying a dihalo aromatic compound to the housing chamber 2 are connected to the side wall 3*a* of the housing chamber 2. A water supply line for supplying water to the housing chamber 2 may also be connected as necessary. A reaction mixture recovery line 7 for recovering a reaction mixture from the housing chamber 2 is connected to the side wall 3*b* of the housing chamber 2. The polar organic solvent, the sulfur source, and the dihalo aromatic compound may be supplied to the liquid phase of the reaction vessel 1*a* via a gas phase or may be supplied directly to the liquid phase of the reaction vessel 1*a*.

The reaction vessel 1*a* and the reaction vessel 1*b* are separated by a partition wall 8*a*, and the reaction vessel 1*b* and the reaction vessel 1*c* are separated by a partition wall 8*b*. The reaction vessels 1*a*, 1*b*, and 1*c* communicate with one another via the gas phase in the housing chamber 2. As a result, the pressure of the gas phase in the housing chamber 2 becomes uniform. Since the housing chamber 2 is installed at an incline so as to form an angle θ with respect to the horizontal plane H, the maximum liquid surface level of a liquid that can be housed is highest in the order of the reaction vessel 1*a*, the reaction vessel 1*b*, and then the reaction vessel 1*c*. The reaction vessels 1*a*, 1*b*, and 1*c* are connected in series in the order described above. Note that in each of the reaction vessels, excluding the reaction vessel 1*a* of the uppermost stream in the movement direction of the reaction mixture, the minimum height of the partition wall on the upstream side in the movement direction is greater than the maximum liquid surface level of that reaction vessel. That is, in the reaction vessel 1*b*, the minimum height of the partition wall 8*a* on the upstream side in the movement direction is greater than the maximum liquid surface level of the reaction vessel 1*b*, and in the reaction vessel 1*c*, the minimum height of the partition wall 8*b* on the upstream side in the movement direction is greater than the maximum liquid surface level of the reaction vessel 1*c*. As a result, counterflow from the reaction vessel 1*b* into the reaction vessel 1*a* and counterflow from the reaction vessel 1*c* into the reaction vessel 1*b* are prevented. The reaction vessels 1*a*, 1*b*, and 1*c* can respectively house reaction mixtures 9*a*, 9*b*, and 9*c*. Note that in another embodiment, the maximum liquid surface level of a liquid that can be housed may be made highest in the order of the reaction vessels 1*a*, 1*b*, and 1*c* not only by installing the housing chamber 2 at an incline, as described above, but also by adjusting the partition wall height.

In the housing chamber 2, a stirring blade 10*a* for stirring the reaction mixture 9*a* in the reaction vessel 1*a*, a stirring blade 10*b* for stirring the reaction mixture 9*b* in the reaction vessel 1*b*, and a stirring blade 10*c* for stirring the reaction mixture 9*c* in the reaction vessel 1*c* are installed on the same shaft 11. The shaft 11 is installed so as to penetrate through the side wall 3*a* from the outside of the housing chamber 2 and to reach the side wall 3*b*. A rotation driving apparatus 12 for rotating the shaft 11 is installed at the end of the shaft 11 on the side wall 3*a* side.

One end of an exhaust line 13 is connected near the side wall 3*a* of the housing chamber 2. A dehydration part 200 for performing dehydration from the gas phase in the housing chamber 2 (not illustrated in FIG. 2) is connected to the other end of the exhaust line 13. The dehydration part 200 communicates with the gas phase in the housing chamber 2 through the exhaust line 13.

A gas feeding part 28 which communicates with the gas phase in the housing chamber 2 and feeds an inert gas to the gas phase from the downstream side toward the upstream side in the movement direction of the reaction mixture, that is, from the reaction vessel 1*c* toward the reaction vessel 1*a*, is connected to the side wall 3*b* of the housing chamber 2 via a gas feeding line 29. The inert gas is not particularly limited, and examples thereof include noble gases such as argon; and nitrogen. Note that in another embodiment, the gas feeding part 28 may not be connected to the side wall 3*b*.

Next, the operation of Embodiment 1 will be described with reference to FIG. 2. A polar organic solvent, at least one type of a sulfur source selected from the group consisting of alkali metal sulfides, alkali metal hydrosulfides, and hydrogen sulfide, and a dihalo aromatic compound are respectively supplied to the housing chamber 2 through the polar organic solvent supply line 4, the sulfur source supply line 5, and the dihalo aromatic compound supply line 6. Note that some or all of the starting materials may be supplied to the housing chamber 2 after being mixed in advance. For example, a mixture of the polar organic solvent and the dihalo aromatic compound may be prepared in advance, and this mixture may be supplied to the housing chamber 2. In this case, a mixture supply line 4*a* (not illustrated) may be connected to the side wall 3*a* instead of the polar organic solvent supply line 4 and the dihalo aromatic compound supply line 6, and the mixture may be supplied to the housing chamber 2 through the mixture supply line 4*a*.

The supplied polar organic solvent, sulfur source, and dihalo aromatic compound are mixed in the reaction vessel 1*a*, and a polymerization reaction is performed between the sulfur source and the dihalo aromatic compound in the polar organic solvent so that a reaction mixture 9*a* is formed.

Note that when the reaction starting materials supplied to the housing chamber 2 are mostly in an anhydrous state, for example, water may be added at at least some of the reaction vessels 1a to 1c to accelerate reactions.

When the height of the reaction mixture 9a exceeds the maximum liquid surface level of the reaction vessel 1a, the reaction mixture 9a flows over the partition wall 8a and into the reaction vessel 1b. In the reaction vessel 1b, as in the case of the reaction vessel 1a, a polymerization reaction is performed between the sulfur source and the dihalo aromatic compound in the polar organic solvent so that a reaction mixture 9b is formed. Further, when the height of the reaction mixture 9b exceeds the maximum liquid surface level of the reaction vessel 1b, the reaction mixture 9b flows over the partition wall 8b and into the reaction vessel 1c. In the reaction vessel 1c, as in the cases of the reaction vessels 1a and 1b, a polymerization reaction is performed between the sulfur source and the dihalo aromatic compound in the polar organic solvent so that a reaction mixture 9c is formed. Finally, when the height of the reaction mixture 9c exceeds the maximum liquid surface level of the reaction vessel 1c, the reaction mixture 9c is recovered through the reaction mixture recovery line 7. PAS or a PAS prepolymer can be obtained by performing a purification operation, an additional polymerization reaction, or the like on the recovered reaction mixture 9c. Note that the maximum liquid surface level of the reaction vessel 1c is determined, for example, by the connection position of the reaction mixture recovery line 7 on the side wall 3b. In this way, due to the difference in height of the maximum liquid surface levels in the reaction vessels 1a to 1c, the reaction mixture sequentially moves from a reaction vessel of a higher maximum liquid surface level to a reaction vessel of a lower maximum liquid surface level in the order of the reaction vessels 1a, 1b, and 1c. Note that the mixtures can flow over the respective partition walls 8a and 8b when the reaction mixtures 9a and 9b exceed the maximum liquid surface levels, and as long as communication among the reaction vessels 1a, 1b, and 1c via the gas phase in the housing chamber 2 is not inhibited, the shapes of the partition walls 8a and 8b are not particularly limited, and any shapes may be used.

Due to the action of the dehydration part 200, at least a portion of the water inside the housing chamber 2 is removed from the housing chamber 2 through the exhaust line 13 via the gas phase in the housing chamber 2. Examples of the water inside the housing chamber 2 include water supplied to the housing chamber 2 and water produced by the polymerization reaction. Here, the water supplied to the housing chamber 2 refers to water that is actively supplied to the housing chamber 2 as well as, in cases in which water is not actively supplied to the housing chamber 2, water that is ordinarily supplied to the housing chamber 2 together with the reaction starting materials in a state in which the water is contained in the reaction starting materials. Since water has a high vapor pressure, when the water content of the gas phase of the housing chamber 2 is high, the inside of the housing chamber 2 tends to assume a high pressure, and the housing chamber 2 needs to be pressure resistant. It is thus difficult to achieve resource saving, equipment cost reduction, or the like. By performing dehydration with the dehydration part 200 to reduce the pressure inside the housing chamber 2, resource saving, equipment cost reduction, and the like can be achieved effectively. The pressure inside the housing chamber 2 may be reduced to approximately 0.2 to 0.3 MPa, for example, and may be preferably reduced to approximately 0.04 MPa.

Since the reaction vessels 1a to 1c communicate with one another via the gas phase in the housing chamber 2 and the pressure of the gas phase in the housing chamber 2 is uniform, water is removed equally from each of the reaction vessels 1a to 1c by the dehydration part 200. Thus, the amount of water in the reaction mixture is reduced as the mixture moves toward the reaction vessel 1c from the reaction vessel 1c, that is, as the mixture moves toward the downstream side from the upstream side in the movement direction of the reaction mixture. As a result, reaction inhibition due to water is suppressed, and the polymerization reaction is accelerated. In addition, the boiling point of the reaction mixture increases, and such an increase allows polymerization at high temperatures, which further accelerates the polymerization reaction. Due to the acceleration of the polymerization reaction described above, the temperature of the reaction mixture tends to increase, and the polymerization reaction therefore tends to be further accelerated. As described above, the PAS continuous production apparatus 101 may be equipped with a means for increasing the temperature of the reaction vessels 1a to 1c from the upstream side toward the downstream side in the movement direction by disposing each part as described above and performing continuous reactions.

An inert gas is fed by the gas feeding part 28 to the gas phase in the housing chamber 2 from the downstream side toward the upstream side in the movement direction of the reaction mixture, that is, from the reaction vessel 1c toward the reaction vessel 1a. As described above, to maintain a state in which the amount of water in the reaction mixture is lower as the reaction mixture moves from the upstream side toward the downstream side in the movement direction of the reaction mixture, the configuration is preferably such that water content evaporated from the reaction mixture flows to the downstream side and is not condensed on the reaction mixture. By feeding an inert gas to the gas phase as described above with the gas feeding part 28, water vapor can be effectively prevented from flowing to the downstream side and condensing on the reaction mixture. Note that in another embodiment, an inert gas may not be fed to the gas phase in the housing chamber 2.

The flow rate of the inert gas is not particularly limited as long as it is within a range that inhibits the flow of water vapor to the downstream side. For example, when the housing chamber 2 has a hollow cylindrical shape with an inside radius r using the side wall 3a and the side wall 3b as a bottom face, the flow rate u of the inert gas is expressed as $u=F/(\pi r^2)$, where F is the volume flow of the inert gas. Here, taking into consideration that Taylor dispersion is established, that is, the state changes from molecular diffusion control to convection diffusion control, when the water vapor is less likely to flow to the downstream side, the relation $r \cdot u \gg D$ (where D is the dispersion coefficient of water vapor) holds as a condition under which Taylor dispersion is established. Based on the above, the flow rate of the inert gas may be a value in a range in which $F \gg D \cdot \pi r$, more specifically $F>10D \cdot \pi r$, preferably $F>25D \cdot \pi r$, and more preferably $F>50D \cdot \pi r$ holds. Note that when the housing chamber 2 has a hollow cylindrical shape having the side walls 3a and 3b as a bottom surface, wherein the cross section perpendicular to the movement direction of the reaction mixture has a discretionary shape, the above relation can be applied with r being defined as the representative length in the direction perpendicular to the movement direction of the reaction mixture, for example, the equivalent circle radius of the cross section with a discretionary shape.

The shaft 11 is rotated by the rotation driving device 12, and the stirring blades 10a to 10c installed on the shaft 11 rotate around the shaft 11 as a result, which causes the reaction mixtures 9a to 9c to be stirred. The stirring blades 10a to 10c are installed on the same shaft 11. Therefore, by simply rotating the shaft 11 with the rotation driving device 12, it is possible to rotate all of the stirring blades 10a to 10c under the same conditions and to achieve uniform stirring with high efficiency. As the polymerization reaction progresses, alkali metal halides such as NaCl are precipitated and accumulate in the reaction vessels 1a to 1c. As a result, for example, the volume effective for advancing a sufficient polymerization reaction in the reaction vessels 1a to 1c decreases, and a reduction in productivity or the like is likely to occur. Therefore, an extra maintenance operation for removing the accumulated alkali metal halides arises. By stirring the reaction mixtures 9a to 9c with the stirring blades 10a to 10c, the alkali metal halides are dispersed in the reaction mixtures 9a to 9c and move to the downstream side. This facilitates discharge of the alkali metal halides to the outside of the housing chamber 2. On the other hand, when stirring is too vigorous, the reaction mixtures tend to flow over the partition wall 8a and/or the partition wall 8b and is unnecessarily immixed in the reaction vessels on the downstream side from the reaction vessels on the upstream side. To promote the dispersion of alkali metal halides and to avoid the unnecessary immixing of reaction mixtures between the reaction vessels, the shapes, the number of blades, the revolution speeds, and the like of the stirring blades are preferably adjusted appropriately. Of these, the revolution speed of the stirring blades may be a revolution speed satisfying conditions under which alkali metal halides are not precipitated, for example. More specifically, the revolution speed may be such that the stirring speed of the stirring blades is not less than the particle suspension limit stirring speed. Note that the upper limit of the revolution speed at the tips of the stirring blades is preferably a revolution speed of not greater than 60 rpm and more preferably not greater than 20.5 rpm from the perspective of more easily preventing the reaction mixtures from flowing over the partition wall 8a and/or the partition wall 8b. In addition, the rotation route or the like of the stirring blades is preferably adjusted appropriately so that stirring is performed sufficiently. For example, the stirring blades preferably at least pass through portions deeper than the average depth of each of the reaction vessels 1a to 1c. In particular, to ensure that stirring is performed sufficiently in the vicinity of the deepest parts of each of the reaction vessels 1a to 1c and that alkali metal halides are not deposited, the sizes of the gap between the stirring blade 10a and the base of the reaction vessel 1a, the gap between the stirring blade 10a and the partition wall 8a, the gap between the stirring blade 10b and the base of the reaction vessel 1b, the gap between the stirring blade 10b and the partition wall 8b, the gap between the stirring blade 10c and the base of the reaction vessel 1c, and the gap between the stirring blade 10c and the side wall 3b are preferably made small.

As described above, the PAS continuous production apparatus 101 does not require a plurality of polymerization vessels. Therefore, the piping, transfer equipment, instruments, and the like between the plurality of polymerization vessels are unnecessary. In addition, the movement or the like of the reaction mixtures is achieved by using gravity to drive the PAS continuous production apparatus 101 based on the difference in the maximum liquid surface level, and a large amount of energy is therefore unnecessary. The PAS continuous production apparatus 101 can therefore easily achieve resource saving, energy saving, equipment cost reduction, and the like.

Embodiment 2 of the Polymerization Part 100

Figure 3:
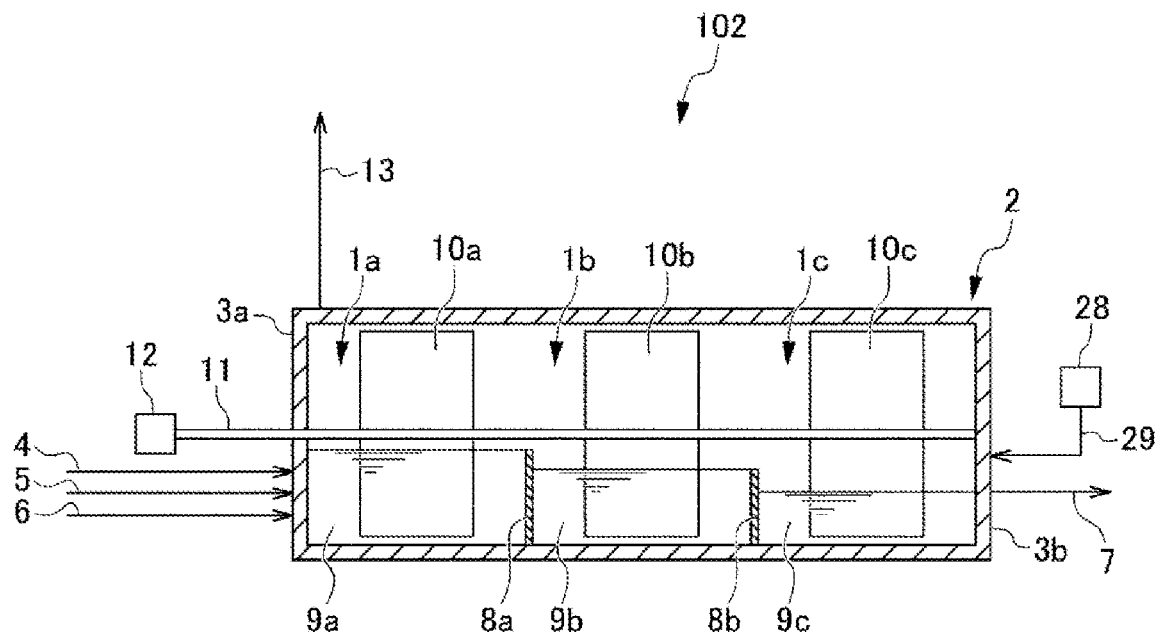
FIG. 3 is a partial cross-sectional view illustrating another embodiment of a polymerization part 100 in the case of a PAS continuous production apparatus.

FIG. 3 is a partial cross-sectional view illustrating another embodiment (called "Embodiment 2" hereafter) of a polymerization part 100 in the case of a PAS continuous production apparatus. The configuration and operation of Embodiment 2 will be described hereinafter with reference to FIG. 3.

A PAS continuous production apparatus 102 according to Embodiment 2 is the same as the PAS continuous production apparatus 101 according to Embodiment 1 with the exception that the housing chamber 2 is installed horizontally, that the height of the partition wall 8a is greater than the height of the partition wall 8b, and that the connection position of the reaction mixture recovery line 7 on the side wall 3b differs.

Since the height of the partition wall 8b is lower than the height of the partition wall 8b, the reaction mixture moves in the order of the reaction vessels 1a, 1b, and 1c, and the PAS continuous production apparatus 102 operates in the same manner as in the case of the PAS continuous production apparatus 101.

In the PAS continuous production apparatus 102, in contrast to the PAS continuous production apparatus 101, the depth of each of the reaction vessels 1a to 1c is roughly constant depending on the location. Therefore, alkali metal halides tend to accumulate over the entire bottom surfaces of the reaction vessels 1a to 1c. Thus, it is particularly preferable to stir sufficiently by the stirring blades 10a to 10c. To ensure that the stirring by the stirring blades 10a to 10c is sufficient so that alkali metal halides are not deposited, the width of the stirring blades 10a to 10c is preferably large. The width of the stirring blades 10a to 10c are, for example, not less than 50%, preferably not less than 60%, more preferably not less than 70%, and even more preferably not less than 80% of the width of the reaction vessels 1a to 1c. In addition, all or a portion of the stirring blades 10a to 10c is preferably positioned in the center of each reaction vessel from the perspective that large deviations in stirring are unlikely to occur.

In an embodiment of the present invention, the stirring shaft described in Embodiments 1 and 2 may be multiple shafts including 2 shafts or 3 or more shafts.

In an embodiment of the present invention, the partition walls described in Embodiments 1 and 2 may be installed on the stirring shaft.

Further, the PAS continuous production apparatus of Embodiment 2 described above may be configured as described in the following modified example.

Modified Example

In the housing chamber of a PAS continuous production apparatus according to a modified example (not illustrated), a plurality of reaction vessels are disposed adjacently in the perpendicular direction. The reaction vessels adjacent to one another are separated by dividers and are configured so that a reaction mixture successively moves from the reaction vessels on the upper side to the reaction vessels on the lower side through communicating tubes. In addition, the gas phase parts of each of the reactions vessels communicate with one another via communicating tubes. Therefore, the pressure of the gas phase of each reaction vessel in the housing chamber is roughly the same. The communicating tubes connecting the gas phase parts may be the same as the communicating tubes through which the reaction mixture moves successively, or may be communication tubes that are provided separately. Here, a case in which a first reaction vessel and a second reaction vessel are provided in order from the upper side in the vertical direction will be described as a specific example. The first and second reaction vessels communicate with one another via a first communicating tube, and the tube wall of the first communicating tube protrudes toward the first reaction vessel side. The height of the tube wall of the first communicating tube is made equal to the maximum liquid surface level of a liquid that can be housed by the first reaction vessel. The first communicating tube passes through a first divider which separates the first and second reaction vessels.

In a PAS continuous production apparatus with such a configuration, when the height of a reaction mixture exceeds the maximum liquid surface level of the first reaction vessel, the reaction mixture flows over the tube wall of the first connection tube and flows into the first connection tube, and then flows into the second reaction vessel via the first connection tube. Such a PAS continuous production apparatus may be configured such that the reaction mixture is moved successively. While the height of the reaction mixture in the first reaction vessel is lower than the maximum liquid surface level of the first reaction vessel, the gas phase parts of the first and second reaction vessels communicate with one another by communicating tubes.

Embodiment 3

Figure 4:
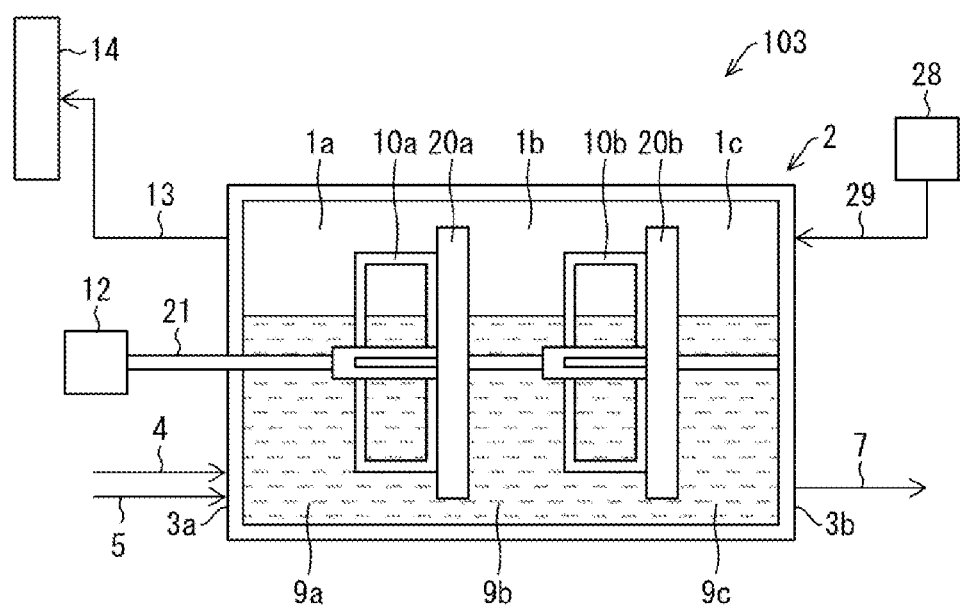
FIG. 4 is a partial cross-sectional view illustrating yet another embodiment of a polymerization part 100 in the case of a PAS continuous production apparatus.

FIG. 4 is a partial cross-sectional view illustrating yet another embodiment (called "Embodiment 3" hereafter) of a polymerization part 100 in the case of a PAS continuous production apparatus. The configuration and operation of Embodiment 3 will be described hereinafter with reference to FIG. 4.

Describing with reference to FIG. 4, a continuous polymerization vessel 104 differs from Embodiment 1 in that the isolation means for isolating the reaction vessels in the housing chamber 2 is not a partition wall but rather a divider having a rotational center.

In this embodiment, the reaction vessels 1a and 1b are separated by a divider 20a, and the reaction vessel 1b and the reaction vessel 1c are separated by a divider 20b. The reaction vessels 1a, 1b, and 1c communicate with one another via the gas phase part in the housing chamber 2.

In addition, a stirring blade 10a for stirring a reaction mixture 9a in the reaction vessel 1a is attached to one side of the divider 20a. Similarly, a stirring blade 10b for stirring a reaction mixture 9b in the reaction vessel 1b is attached to one side of the divider 20b. Note that the stirring blades 10a and 10b in this embodiment have a structure in which openings are formed on the insides thereof.

The stirring blades 10a and 10b and the dividers 20a and 20b are all installed on the same rotation shaft 21. The rotation shaft 21 is installed so as to penetrate through the side wall 3a from the outside of the housing chamber 2 and to reach the side wall 3b. A rotation driving device 12 for rotating the rotation shaft 21 is installed at the end of the rotation shaft 21 on the side wall 3a side.

Note that the stirring blades can be installed at any position with respect to the dividers. The dividers may be on the upstream side or the downstream side of the stirring blades, or a combination thereof may be used. The dividers may be distanced from the stirring blades but are preferably connected in close proximity, as illustrated in FIG. 4, so that the dividers can be fixed and reinforced. In addition, the stirring blades and the dividers are not necessarily provided as pairs, and there may be sections having no stirring blade between adjacent dividers. By providing at least one stirring blade, it is possible to assist the progression of the polymerization reaction and to more smoothly move solids in the reaction mixture. Alternatively, a stirring blade may not be provided, which enables a simpler device configuration.

The shape of the dividers is not particularly limited and may be any shape which has a rotational center and provides clearance or an opening part of a prescribed width so that adjacent reaction vessels can communicate with one another while the vertical cross section inside the housing chamber 2 is partially covered. For example, when the housing chamber 2 has a hollow cylindrical shape, the dividers may be disc-shaped dividers having a radius one size smaller than the inside space of the housing chamber as illustrated in FIG. 3. Note that the shape of the dividers is not limited to this example, and may be a basket-like rotating member that does not have a central axis.

The number of dividers provided on the rotational shaft may be any number of 1 or greater in accordance with the size of the housing chamber, the type of polymerization reaction, and the like.

When two or more dividers are provided, they may have the same shape or may have different shapes.

In addition, the position of each divider is not particularly limited, and the dividers can be provided at any position.

On the other hand, the shape of the stirring blades is not particularly limited and may be any shape provided on the same axis as the dividers so as to stir the reaction mixture. As illustrated in FIG. 4, the stirring blades 10 may be attached to either side of the dividers 20 or may be attached to both sides thereof. Alternatively, the stirring blades 10 may be attached to the top of the rotation shaft 21 separately from the dividers.

The liquid phase parts of the reaction vessels 1a to 1c communicate with one another. As a result, the starting materials and solvents supplied to the reaction vessel 1a successively move to the reaction vessels 1b and 1c while advancing the polymerization reaction as a reaction mixture.

In addition, the gas phase parts of the reaction vessels 1a to 1c communicate with one another. As a result, the pressure of the gas phase in the housing chamber 2 becomes uniform. The evaporated components generated at the time of polymerization in each reaction vessel successively move from the reaction vessel 1c toward the reaction vessels 1b and 1a via the gas phase part due to difference in temperature inside the apparatus and the like and are discharged from the exhaust line 13.

In the continuous polymerization vessel 103 of this embodiment, there is a clearance of a prescribed width between the inside wall of the housing chamber 2 and the respective outer edges of the dividers 20a and 20b. As a result, the gas phase parts and the liquid phase parts of adjacent reaction vessels communicate with one another so that the reaction mixture, a gas containing evaporation components, and the like move through the parts. Note that an opening part such as a through-hole or a slit, for example, may be provided in the dividers instead of a clearance, and the reaction vessels may be allowed to communicate via this opening part. Alternatively, both a clearance and an opening part may be provided. Alternatively, the dividers may have a mesh shape including a plurality of small through-holes.

The width of the clearance or the size of the opening part is not particularly limited and may be set appropriately in accordance with the shape of the container, the shape and number of dividers, and the like.

Figure 5:
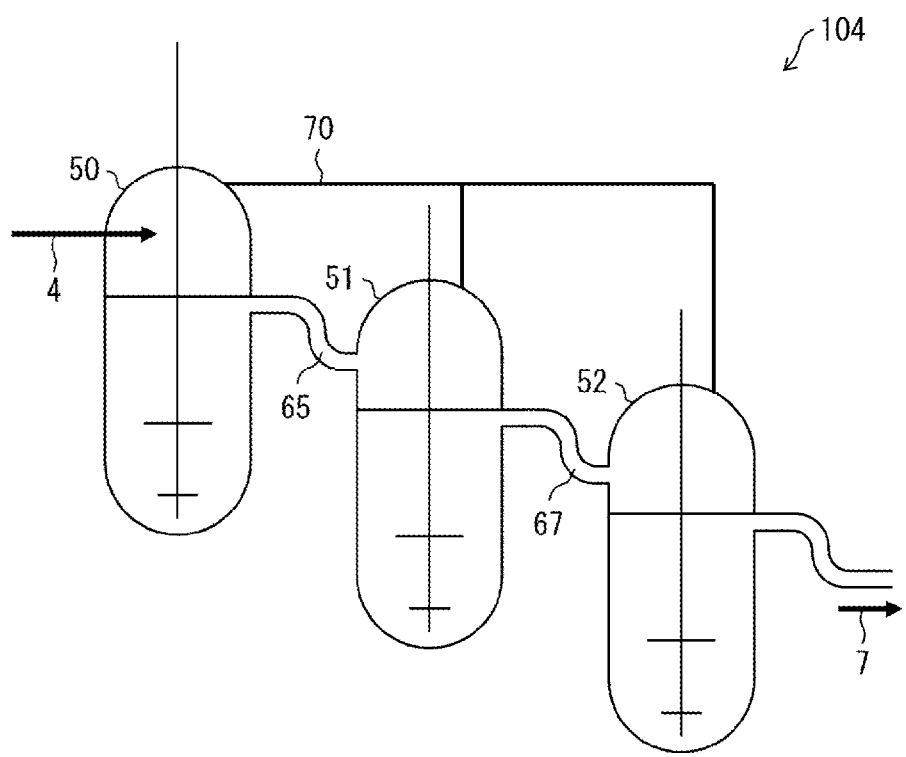
FIG. 5 is a partial cross-sectional view illustrating yet another embodiment of a polymerization part 100 in the case of a PAS continuous production apparatus.

Embodiment 4 of polymerization part 100 FIG. 5 is a partial cross-sectional view illustrating yet another embodiment (called "Embodiment 4" hereafter) of a polymerization part 100 in the case of a PAS continuous production apparatus. The configuration and operation of Embodiment 4 will be described hereinafter with reference to FIG. 5.

Describing with reference to FIG. 5, a continuous production apparatus 104 includes a first reaction vessel 50, a second reaction vessel 51, and a third reaction vessel 52. The second reaction vessel 51 is disposed beneath the first reaction vessel 50 in the vertical direction, and the third reaction vessel 52 is disposed beneath the second reaction vessel 51 in the vertical direction.

The first and second reaction vessels 50 and 51 are connected by a first pipe 65. In addition, the second and third reaction vessels 51 and 52 are connected by a second pipe 67. Note that in the continuous production apparatus 104 in this embodiment, the reaction starting materials are supplied to the first reaction vessel 50.

The polymerization solvents and reaction starting materials are supplied from the polar organic solvent supply line 4 to the first reaction vessel 50, and the first pipe 65 is provided so that the reaction mixture moves to the second reaction vessel 51 through the first pipe 65 when the reaction mixture inside the first reaction vessel 50 exceeds the maximum liquid surface level. In addition, the second pipe 67 is provided so that the reaction mixture moves to the third reaction vessel 52 through the second pipe 67 when the reaction mixture inside the second reaction vessel 51 exceeds the maximum liquid surface level. The reaction mixture is then recovered through the reaction mixture recovery line 7 of the third reaction vessel 52.

A ventilation part 70 is connected to each of the first through third reaction vessels 50 to 52. The first through third reaction vessels 50 to 52 communicate with one another through the gas phase via the ventilation part 70.

With the configuration of such a continuous production apparatus 104, the same effects as those of Embodiment 1 can be achieved, even when the reaction mixture is successively moved using the difference in the maximum liquid surface levels of each of the first reaction vessel 50 and the second reaction vessel 51. Further, with the continuous production apparatus 104, it is unnecessary to provide partition walls such as those described in Embodiment 1.

SUMMARY

The PAS production method according to an embodiment of the present invention includes:
a condensation step of obtaining, by condensation from a gas phase in a gas-liquid system including a gas phase containing water, a dihalo aromatic compound, and hydrogen sulfide and a liquid phase containing a polar organic solvent and PAS, a first intermediate gas phase containing a dihalo aromatic compound and hydrogen sulfide and a first intermediate liquid phase containing water, a dihalo aromatic compound, and a sulfur source;
a first recovery step of bringing the first intermediate gas phase into contact with a polar organic solvent to obtain a first recovered gas phase containing hydrogen sulfide and a first recovered liquid phase containing a polar organic solvent, a dihalo aromatic compound, and a sulfur source; and
a second recovery step of bringing the first recovered gas phase into contact with an alkali metal hydroxide aqueous solution to obtain a second recovered liquid phase containing water, a sulfur source, and an alkali metal hydroxide.

The PAS production method according to an embodiment of the present invention preferably further includes, prior to the condensation step, a polymerization step of polymerizing the sulfur source and the dihalo aromatic compound in a polar organic solvent while evaporating water from the liquid phase of the reaction system containing a polar organic solvent, water, a sulfur source, and a dihalo aromatic compound to the gas phase of the reaction system to produce PAS and to obtain the gas-liquid system described above.

In the PAS production method according to an embodiment of the present invention, at least a portion of the dihalo aromatic compound in the first recovered liquid phase is preferably used as at least a portion of the dihalo aromatic compound in the polymerization step.

In the PAS production method according to an embodiment of the present invention, at least a portion of the sulfur source in the first recovered liquid phase is preferably used as at least a portion of the sulfur source in the polymerization step.

In the PAS production method according to an embodiment of the present invention, the polar organic solvent in the first recovered liquid phase is preferably of the same type as the polar organic solvent in the polymerization step.

In the PAS production method according to an embodiment of the present invention, at least a portion of the sulfur source in the second recovered liquid phase is preferably used as at least a portion of the sulfur source in the polymerization step.

In the polymerization step of the PAS production method according to an embodiment of the present invention, PAS is preferably produced continuously by performing the following operations concurrently:
Operation 1: a continuous starting material supply operation of continuously supplying a polar organic solvent, a sulfur source, and a dihalo aromatic compound;
Operation 2: a continuous dehydration operation of continuously discharging the water inside the reaction system to the outside of the reaction system;
Operation 3: a continuous polymerization operation of continuously polymerizing the sulfur source and the dihalo aromatic compound in a polar organic solvent;
Operation 4: a pressure adjustment operation of adjusting the pressure inside the reaction system by continuously discharging non-condensable gas inside the reaction system to the outside of the reaction system; and
Operation 5: a continuous recovery operation of continuously recovering the produced reaction mixture.

In the PAS production method according to an embodiment of the present invention, it is preferable for at least a portion of the hydrogen sulfide in the first intermediate liquid phase (1) to be absorbed in advance in the alkali metal hydroxide aqueous solution used in the second recovery step; (2) to be brought into contact with the alkali metal hydroxide aqueous solution together with the first recovered gas phase in the second recovery step; and/or (3) to be absorbed in the second recovered liquid phase.

In the PAS production method according to an embodiment of the present invention, at least a portion of the dihalo aromatic compound in the first intermediate liquid phase is preferably used as at least a portion of the dihalo aromatic compound in the polymerization step.

The PAS production apparatus according to an embodiment of the present invention includes:
a dehydration part configured to produce, by condensation from a gas phase in a gas-liquid system including a gas phase containing water, a dihalo aromatic compound, and hydrogen sulfide and a liquid phase containing a polar organic solvent and PAS, a first intermediate gas phase containing a dihalo aromatic compound and hydrogen sulfide and a first intermediate liquid phase containing water, a dihalo aromatic compound, and a sulfur source;

a first recovery part configured to bring the first intermediate gas phase into contact with a polar organic solvent to produce a first recovered gas phase containing hydrogen sulfide and a first recovered liquid phase containing a polar organic solvent, a dihalo aromatic compound, and a sulfur source; and a second recovery part configured to bring the first recovered gas phase into contact with an alkali metal hydroxide aqueous solution to produce a second recovered liquid phase containing water, a sulfur source, and an alkali metal hydroxide.

The PAS production apparatus according to an embodiment of the present invention may further include a polymerization part configured to polymerize the sulfur source and the dihalo aromatic compound in a polar organic solvent while evaporating water from the liquid phase of the reaction system containing a polar organic solvent, water, a sulfur source, and a dihalo aromatic compound to the gas phase of the reaction system to produce PAS and to obtain the gas-liquid system described above.

EXAMPLES

Embodiments of the present invention will be described in further detail hereinafter using examples. The present invention is not limited to the examples below, and it goes without saying that various aspects are possible with regard to the details thereof.

Example 1

The PAS production apparatus illustrated in FIG. 1 was used. The same PAS continuous production apparatus as that illustrated in FIG. 2 was used as the polymerization part 100, with the exception that the housing chamber 2 was divided by five partition walls so as to include six reaction vessels. This PAS continuous production apparatus was a Ti reaction apparatus having partition walls with a semicircular shape and having dimensions with a diameter of 100 mm×length of 300 mm. After 950 g of NMP was charged into the PAS continuous production apparatus, the starting materials were continuously supplied from each supply line at a flow rate of 3.52 g/min for an NMP-pDCB mixture (NMP: pDCB (mass ratio)=990:278) and 0.84 g/min for a 36 mass % NaSH aqueous solution using a constant rate pump while the temperature 1 of the portion divided by the first and second partition walls from the upstream side was maintained at 230° C. and the temperature 2 of the portion divided by the third and fourth partition walls was maintained at 260° C. At the same time, using the dehydration part 200 as a distillation device connected to the PAS continuous production apparatus, water was continuously removed from the PAS continuous production apparatus while regulating the pressure to a gauge pressure of 0.32 MPa with a pressure adjustment valve. Further, the pDCB in the water that was removed was separated by a settler constituting a portion of the dehydration part 200 and returned to the PAS continuous production apparatus. The water and the sulfur source of the first intermediate liquid phase were disposed of through the line L7. The gas from the dehydration part 200 was brought into contact with NMP at a flow rate of 0.5 g/min with a countercurrent through the first recovery part 300, which was a packed column. The liquid phase from the first recovery part 300 was returned to the PAS continuous production apparatus. On the other hand, the gas from the first recovery part 300 was brought into contact with a 15.84 mass % sodium hydroxide aqueous solution at a flow rate of 1.37 g/min with a countercurrent through the second recovery part 400, which was a packed column. The liquid phase from the second recovery part 400 was returned to the PAS continuous production apparatus. On the other hand, the gas from the second recovery part 400 was discharged through the line L14 after hydrogen sulfide was completely absorbed and recovered through 5 kg of a 5 mass % sodium hydroxide aqueous solution. The polymerization reaction product was continuously discharged by spilling from the PAS continuous production apparatus and then cooled.

The above operation was continued for five hours, and the material balance of the sulfur source was investigated. Specifically, the amount of the sulfur source supplied through the line L2, the amount of the sulfur source recycled through the lines L11 and L13, and the amount of the sulfur source lost through the lines L7 and L14 were measured on the basis of hydrogen sulfide. The results are shown in Table 1.

TABLE 1

|  | Amount supplied | Recycled amount | | Lost amount | |
| --- | --- | --- | --- | --- | --- |
|  | L2 | L11 | L13 | L7 | L14 |
| Amount of sulfur source in terms of H$_2$S (mmol/min) | 5.40 | 0.03 | 1.28 | 0.207 | 0.0163 |
| Ratio to amount supplied (mol %) | 100 | 0.556 | 23.68 | 3.83 | 0.302 |
|  |  | 24.26 | | 4.14 | |

Example 2

The material balance of sulfur was investigated in the same manner as in Example 1 with the exception that the operation time was changed from 5 hours to 2 hours and that the flow rate and composition of the NMP-pDCB mixture were respectively changed to 3.54 g/min and NMP:pDCB (mass ratio)=988:286. The results are shown in Table 2.

TABLE 2

|  | Amount supplied | Recycled amount | | Lost amount | |
| --- | --- | --- | --- | --- | --- |
|  | L2 | L11 | L13 | L7 | L14 |
| Amount of sulfur source in terms of H$_2$S (mmol/min) | 5.40 | 0 | 1.28 | 0.207 | 0.00393 |
| Ratio to amount supplied (mol %) | 100 | 0 | 23.68 | 3.83 | 0.073 |
|  |  | 23.68 | | 3.91 | |

Example 3

The material balance of sulfur was investigated in the same manner as in Example 1 with the exception that the operation time was changed from 5 hours to 7 hours, that the flow rate and composition of the NMP-pDCB mixture were respectively changed to 3.55 g/min and NMP:pDCB (mass ratio)=986:294, and that the flow rate of the 15.84 mass % sodium hydroxide aqueous solution was changed to 1.36 g/min. The results are shown in Table 3.

TABLE 3

|  | Amount supplied | Recycled amount | | Lost amount | |
| --- | --- | --- | --- | --- | --- |
|  | L2 | L11 | L13 | L7 | L14 |
| Amount of sulfur source in terms of H$_2$S (mmol/min) | 5.40 | 0 | 1.28 | 0.207 | 0.0783 |
| Ratio to amount supplied (mol %) | 100 | 0 | 23.68 | 3.83 | 1.45 |
|  |  | 23.68 | | 5.28 | |

Comparative Example 1

The material balance of sulfur was investigated in the same manner as in Example 1 with the exception that the operation time was changed from 5 hours to 7 hours, that the first and second recovery parts 300 and 400 were not used, and that the gas from the dehydration part 200 was used instead of the gas from the second recovery part 400. The results are shown in Table 4.

TABLE 4

|  | Amount supplied | Recycled amount | | Lost amount | |
| --- | --- | --- | --- | --- | --- |
|  | L2 | L11 | L13 | L7 | L14 |
| Amount of sulfur source in terms of H$_2$S (mmol/min) | 5.40 | — | — | 0.207 | 0.779 |
| Ratio with respect to amount supplied (mol %) | 100 | — | — | 3.83 | 14.43 |
|  |  | — | | 18.26 | |

As can be seen from Tables 1 to 3, in the examples using the first and second recovery parts 300 and 400, as much as around 24 mol % of the total amount of sulfur that was supplied was recycled, while the amount of sulfur that was lost was kept very low at approximately 4 to 5 mol %.

In contrast, as can be seen from Table 4, in the comparative example in which neither the first recovery part 300 nor the second recovery part 400 was used, as much as approximately 18 mol % of the sulfur was lost, while there was practically no recycled sulfur present whatsoever.

The invention claimed is:

1. A method of producing polyarylene sulfide, the method comprising:
    a condensation step of obtaining, by condensation from a gas phase in a gas-liquid system including a gas phase containing water, a dihalo aromatic compound, and hydrogen sulfide and a liquid phase containing a polar organic solvent and polyarylene sulfide obtained by polymerization, a first intermediate gas phase containing a dihalo aromatic compound and hydrogen sulfide and a first intermediate liquid phase containing water, a dihalo aromatic compound, and a sulfur source;
    a first recovery step of bringing the first intermediate gas phase into contact with a polar organic solvent to obtain a first recovered gas phase containing hydrogen sulfide and a first recovered liquid phase containing a polar organic solvent, a dihalo aromatic compound, and a sulfur source; and
    a second recovery step of bringing the first recovered gas phase into contact with an alkali metal hydroxide aqueous solution to obtain a second recovered liquid phase containing water, a sulfur source, and an alkali metal hydroxide, wherein the ratio S1/S2 of the number of moles (S1) of the hydrogen sulfide in the first intermediate gas phase to the number of moles (S2) of the sulfur source in the first intermediate liquid phase in terms of hydrogen sulfide is 1 to 1000.

2. The method according to claim 1, further comprising, prior to the condensation step, a polymerization step of polymerizing the sulfur source and the dihalo aromatic compound in a polar organic solvent while evaporating water from the liquid phase of the reaction system containing a polar organic solvent, water, a sulfur source, and a dihalo aromatic compound to the gas phase of the reaction system to produce polyarylene sulfide and to obtain the gas-liquid system.

3. The method according to claim 2, wherein at least a portion of the dihalo aromatic compound in the first recovered liquid phase is used as at least a portion of the dihalo aromatic compound in the polymerization step.

4. The method according to claim 2, wherein at least a portion of the sulfur source in the first recovered liquid phase is used as at least a portion of the sulfur source in the polymerization step.

5. The method according to claim 3, wherein the polar organic solvent in the first recovered liquid phase is of the same type as the polar organic solvent in the polymerization step.

6. The method according to claim 2, wherein at least a portion of the sulfur source in the second recovered liquid phase is used as at least a portion of the sulfur source in the polymerization step.

7. The method according to claim 2, wherein in the polymerization step, polyarylene sulfide is produced continuously by performing the following operations concurrently:
    Operation 1: a continuous starting material supply operation of continuously supplying a polar organic solvent, a sulfur source, and a dihalo aromatic compound;
    Operation 2: a continuous dehydration operation of continuously discharging the water inside the reaction system to the outside of the reaction system;
    Operation 3: a continuous polymerization operation of continuously polymerizing the sulfur source and the dihalo aromatic compound in a polar organic solvent;
    Operation 4: a pressure adjustment operation of adjusting the pressure inside the reaction system by continuously discharging non-condensable gas inside the reaction system to the outside of the reaction system; and
    Operation 5: a continuous recovery operation of continuously recovering the produced reaction mixture.

8. The method according to claim 1, wherein at least a portion of the hydrogen sulfide in the first intermediate liquid phase (1) is absorbed in advance in the alkali metal hydroxide aqueous solution used in the second recovery step; (2) is brought into contact with the alkali metal hydroxide aqueous solution together with the first recovered gas phase in the second recovery step; and/or (3) is absorbed in the second recovered liquid phase.

9. The method according to claim 2, wherein at least a portion of the dihalo aromatic compound in the first intermediate liquid phase is used as at least a portion of the dihalo aromatic compound in the polymerization step.

* * * * *